Dec. 13, 1955 N. G. COLLIGNON 2,726,692
RIP AND DADO FENCE
Filed May 3, 1954
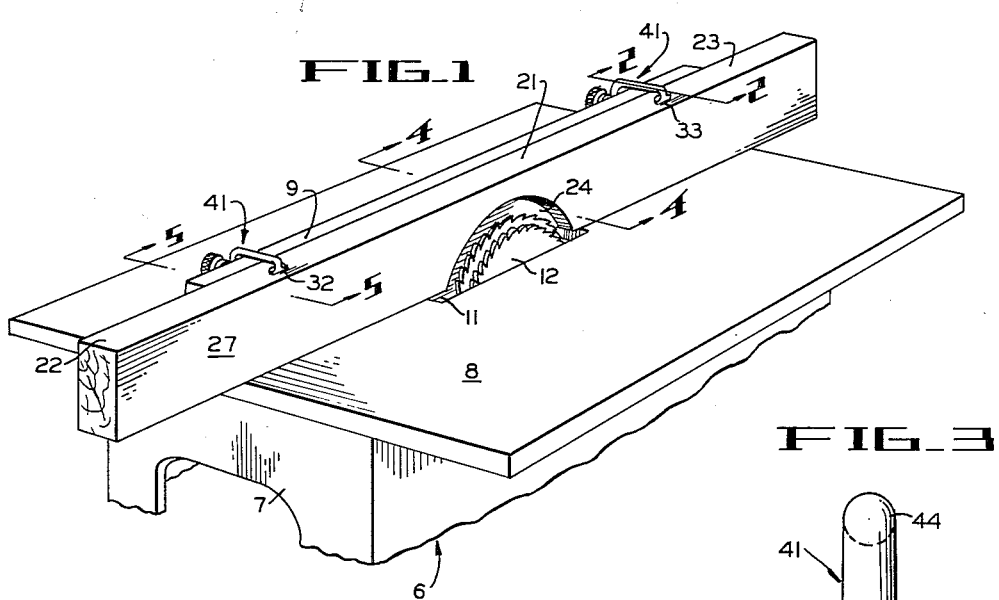
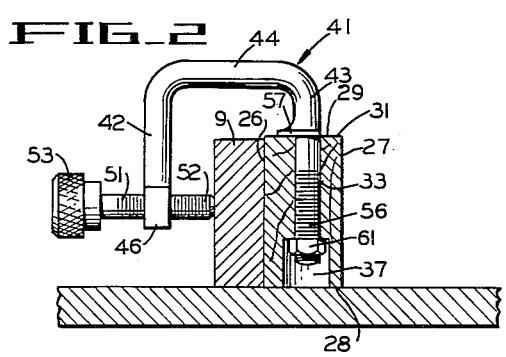
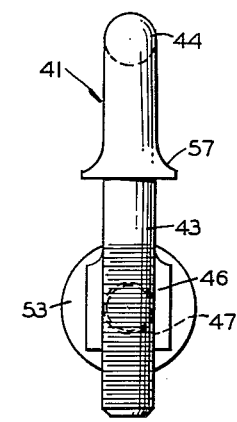
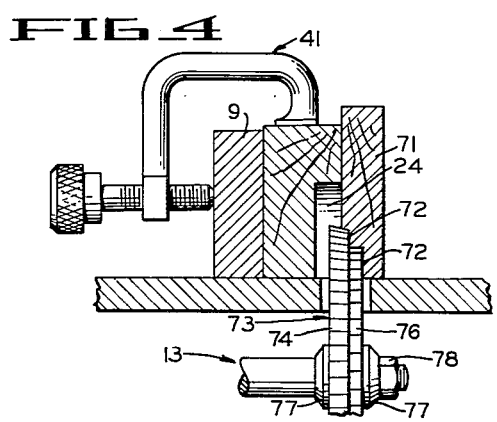
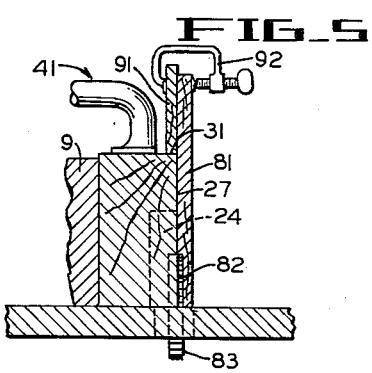
INVENTOR.
NORMAN G. COLLIGNON
BY
ATTORNEY

United States Patent Office 2,726,692
Patented Dec. 13, 1955

2,726,692
RIP AND DADO FENCE
Norman G. Collignon, Arbuckle, Calif.
Application May 3, 1954, Serial No. 427,178
2 Claims. (Cl. 144—253)

My invention relates to improvements in fences for table saws and more particularly to fences for attachment to table saws equipped with saw table fences and for guiding and positioning material, such as wood, to be rip-sawed and dadoed.

While it is customary for a table saw to be equipped with a metal fence slidable back and forth on the saw table and which is used for guiding lumber to be cut, it is frequently found that where thin material is to be sawed or a shallow rabbet is to be cut, the fence in being adjusted is inadvertently moved into contact with the rotating blades of the saw. As a consequence, the metal fence is sometimes broken and badly damaged or the saw blade fractured. This situation occurs most frequently when the fence is moved very closely to the saw blade so as to cut a thin strip of material from the material being ripped, or so as to plow out, as by dadoing, a shallow groove on one side of a piece of material.

Another disadvantage of the customary table saw fence is that for convenience in manufacture, transportation and sale, saw fences found on the customary saw table are short in length, do not extend beyond the confines of the saw table and thus furnish an inadequate guide or support for the lumber, particularly where long pieces of material are to be cut.

It is therefore an object of my invention to provide a combination rip and dado fence which is substantially longer than the customary metal saw fence encountered in table saws, and which extends not only beyond each end of the fence of the kind presently used but also projects beyond the confines of the saw table itself.

It is a further object of my invention to provide a saw fence constructed of a material which substantially reduces the risk of fracture of a saw or dado blade or tooth in the event of contact between the fence and blade.

It is still another object of my invention to provide a combination rip and dado fence which will permit very thin lumber to be ripped and which allows a very thin dado cut to be made along the lower and inner side of a thin piece of material.

It is yet another object of my invention to provide a fence quickly and easily attachable and detachable from existing metal rip fences.

It is a yet further object of my invention to provide a rip and dado fence which can be used with equal facility on either side of an existing saw table fence.

Another object of my invention is to provide a generally improved combination rip and dado fence.

Other objects, together with the foregoing, are obtained in the embodiment of my invention described in the following description and illustrated in the accompanying drawing, in which:

Figure 1 is a perspective view of a saw table and saw fence having attached thereto my improved combination rip and dado fence.

Figure 2 is a sectional view along the plane generally indicated by the line 2—2 of Figure 1.

Figure 3 is a side view of the U-clamp shown in Figure 2, the view being to an enlarged scale.

Figure 4 is a fragmentary sectional view along the plane generally indicated by the line 4—4 of Figure 1, and showing, in addition, a piece of material being grooved.

Figure 5 is a section along the plane indicated generally by the line 5—5 of Figure 1, and showing, in addition, a thin piece of wood being dadoed at its innermost and bottom portion and illustrating the positioning and guiding function of the outermost top side of the fence of my invention.

A table saw, generally designated 6, customarily includes a framework 7 supporting a table 8 and including a fence 9, ordinarily of metal. The fence 9 is slidably disposed on the table surface and can usually be clamped in any desired position on the table 8 and parallel to the planes of the saw or dado blades when it is necessary to furnish a guide for ripping or dadoing material, such as lumber. A slot 11 is provided in a central location on the table and projecting upwardly through the slot is a saw 12 or, as illustrated in Figure 1, an accessory such as a dado blade rotatably mounted and disposed on a rotating member such as an arbor 13 or mandrel below the table, the upper portion only of the saw or dado projecting upwardly through the slot.

Detachably connected to the metal saw fence 9 is a rectilinear elongated block 21 of a material such as wood, the block having one end 22 and the other end 23 extending outwardly from opposite margins of the saw table 8. The ends may be extended outwardly any suitable distance but even a slight projection on either end results in an improved side supporting member for a piece of material to be cut. The additional length results in a greater accuracy of cut since with a long fence the material being sawed does not have the tendency to cant as is the case where a relatively short fence, such as the metal fence provided with the table saw, is used. I have also found that even greater accuracy of cutting is obtained by making the block of a greater vertical dimension than the metal fence.

Intermediate the ends 22 and 23 of the block is a recess 24 arcuate in shape and extending part of the way only into the block and as appears most clearly in Figure 4. In assembled position, the block is disposed with its inner face 26 in abutment with the adjacent face of the metal fence and with its working or guide face 27 facing in a direction away from the metal fence. The block's lower surface 28 is flat and is supported by the top of the table 8. The top surface 29 of the block is carefully trued so that the portion 31 of the top surface adjacent the edge of the guide face 27 is flat and smooth along the entire length of the block.

On opposite sides of the recess 24 and passing vertically through the block from the upper surface 29 downwardly to the lower surface of the block is a pair of bores 32 and 33 respectively. Coaxial with the axes of the vertical bores 32 and 33 is a corresponding pair of counterbores 37.

In order to clamp the block 21 to the metal fence 9, I provide a pair of U-shaped clamps, generally designated by the reference numeral 41, each of the clamps comprising an outer shank 42 and, parallel thereto, an inner shank 43, the upper ends of both shanks being connected by a cross member 44. At the lower end of the outer shank 42 the shank is enlarged to form a boss 46 having therein a threaded aperture 47 facing toward the inner shank 43. A bolt 51, having screw threads 52 on its inner end, is disposed in threaded engagement with the threaded aperture 47 in the boss. At the outermost end of the bolt 51 a knob 53, preferably knurled, is provided to enable the user to screw the bolt inwardly and outwardly to clamp and unclamp the block 21 on the metal fence. The inner shank 43 is provided, adjacent its lower end, with screw threads 56 and, adjacent its upper portion, is formed to an enlarged portion 57 or flange, the portion of the flange on the side away from the outer shank 42 being interrupted or cut away so that the flange does not extend beyond the perimeter of the shank itself, thus leaving uninterrupted the flat smooth portion 31 between the side of the shank and the upper edge of the guide face 27 of the wooden block.

The shank 43 is inserted in the vertical bore in the block, a fastening 61, such as a nut, is placed in threaded engagement with the bottom threaded portion 56 and the nut taken up, such as by a socket wrench, the counterbore being of sufficient extent to permit the head of a socket wrench to fit over the nut 61 while the nut is being screwed into place. When the nut 61 is taken up, the wooden block is securely clamped between the inner face of the nut and the inner face of the flange 57.

When the knurled bolt 51 is not in clamped position, the rip and dado fence of my invention can, if desired, be lifted upwardly from the metal fence 9 and be put aside until its use is required. When ripping or dadoing is to be accomplished, the inner face 26 of the block 21 is placed in abutment with one side or the other of the metal fence 9, my combination fence being equally efficacious for its purpose whether the block is placed on one side of the metal fence or the other. This reversible feature has been found particularly useful for persons who are left handed and who therefore prefer to perform the ripping or dadoing operation from a side opposite to that customarily employed by right handed persons. As soon as the block has been placed in abutment with the metal fence and has been leveled by having the bottom surface 28 of the block in full contact with the table top, the metal fence is clamped to the block by taking up tightly on the knurled knob 53 and the bolt 51.

While the combination fence of my invention can be used with the saw in any position, such as a ripping position wherein the saw is spaced at some distance from the face of the fence, it can with especial facility be used for work requiring narrow ripping cuts or with dadoing which is to be accomplished on the innermost and bottom side of a piece of thin material or stock. With particular reference to Figure 4, it will be seen that if it is desired to rabbet or cut out a relatively shallow groove or portion of a piece of wood 71, the cut out or rabbeted portion being designated by numeral 72, the fence of my invention can be moved so that the recess 24 partially covers a dado head 73, the head in this case comprising an innermost blade 74 and an outermost blade 76, the relative sizes and shapes of the blade being chosen so as to accomplish the desired configuration of cut 72. The dado head 73 is mounted on the rotatable mandrel 13 or arbor and suitably held in place by a pair of clamping plates 77 and by a fastener 78, such as a nut. In the customary table saw the mandrel 13 is movable upwardly and downwardly to give the height of cut desired, the arcuate recess 24 being customarily cut to a diameter sufficient to handle the dado or circular saw head in its uppermost position. It is to be noted that the outermost or working or guide face 27 of the block furnishes a very considerable surface area against which the innermost side of the board 71 to be cut can be supported and guided throughout its entire length of contact. This feature assists substantially in assuring that an even uniform cut or rabbet is made. It is especially to be noted that the face 27 of the block at no point throughout its entire surface area is interrupted or interfered with by a projection, nor is there any interruption or interference throughout the plane extending vertically upwardly from the outermost face 27. This enables a board of any reasonable height to be dadoed or ripped and therefore distinguishes this fence from the customary fences having unsightly and objectionable interruptions in either the surface of the fence or in the plane above the surface of the fence. As will be seen most clearly in Figure 4, even if the user were inadvertently to move the fence toward the right so that the dado head cuts into the fence, no particular harm would accrue such as fracturing of the teeth or blades since the dado head would merely cut into the relatively soft wooden block. With the provision of the recess 24 it can be seen that a narrow groove or rabbet can be made even on a very thin piece of material and, with especial reference to Figure 5, it can be seen that when a narrow piece of material 81 is to be rabbeted at its lower and innermost edge 82 this operation can be accomplished by a saw blade 83 projecting upwardly into the cavity 24 and having only the outermost portion of the blade extending outwardly beyond the confines of the outermost face 27, and by a predetermined amount. The recess feature therefore enables the user to cut a very shallow rabbet or to shave a very narrow notch in a piece of wood and which otherwise could not be performed. The upper and outermost smooth surface 31 of the block effects a further and important result. When cutting or dadoing a piece of narrow material such as that illustrated in Figure 5 and where the material extends upwardly beyond the upper surface of the block, a supplementary supporting and positioning cleat 91 may be utilized, the cleat 91 having its lower surface supported on the surface 31 of the wooden block and being clamped by a fastener, such as a C-clamp 92, to the strip 81 to be cut. In woodworking practice, considerable difficulty is encountered with narrow strips 81 of the kind illustrated since the strip tends to become inclined about along a horizontal, transverse axis, the lower leading edge of the strip tending to become wedged in the slot 11 of the saw table as the wood is fed into the saw. By use of the supplementary guiding cleat 91, the lower surface of which slides along the surface 31 thereby keeping the board 81 level throughout its travel along the face of the fence, the tendency to incline or tip and to become wedged in the slot 11 is obviated and a more accurate cut is obtained.

What is claimed is:

1. A rip and dado fence comprising an elongated rectilinear block adapted to abut along one side a table saw fence, and having intermediate the ends thereof an arcuate cut-out portion, a pair of vertically disposed bores in said block on each side of said cut-out portion, a pair of counterbores concentrically disposed with respect to corresponding ones of said bores and opening downwardly to the surface of a saw table, a pair of U-clamps each including a first shank having an enlargement at the lower end thereof, a threaded aperture in said enlargement, a bolt having a knurled knob on its outer portion and threads on the inner portion thereof in engagement with said threaded aperture, and a second shank extending below said first shank and disposed in said vertical bore and projecting into said counterbore, said second shank having a flange intermediate the ends thereof, said flange being interrupted on the side of said flange away from said first shank, and means for fastening said second shank to said block.

2. A rip and dado fence comprising an elongated rectilinear block for use with a table saw fence, an arcuate recess in one side of said block intermediate the ends thereof, a pair of vertical apertures extending from the top of said block to the bottom of said block, said apertures being disposed on opposite sides of said recess, a pair of U-shaped clamps each having a first shank disposed in the corresponding one of said vertical apertures, said first shank including a flange adjacent its upper end supported on said top of said block, said flange being interrupted adjacent said one side of said block and spaced therefrom, means for securing said first shank in said vertical aperture, said U-shaped clamp also having a second shank disposed on the other side of said block, said second shank having an enlargement at the bottom thereof, a threaded opening in said enlargement, and a knurled nut in threaded engagement with said threaded opening and rotatable by hand whereby said table saw fence is clamped to said other side of said block.

References Cited in the file of this patent

UNITED STATES PATENTS

| 363,016 | Stalter | May 17, 1887 |
| 1,566,225 | Mills | Dec. 15, 1925 |
| 2,381,564 | Taylor | Aug. 7, 1945 |
| 2,554,730 | Chandler | May 29, 1951 |